US009020722B1

(12) United States Patent
Wilke

(10) Patent No.: US 9,020,722 B1
(45) Date of Patent: Apr. 28, 2015

(54) CONTROL OF POWER-ON DOWNSHIFT IN A VEHICLE WITH AN ONCOMING BINARY CLUTCH

(71) Applicant: GM Global Technology Operations LLC, Detroit, MI (US)

(72) Inventor: Nathaniel E. Wilke, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/087,410

(22) Filed: Nov. 22, 2013

(51) Int. Cl.
| *B60W 10/06* | (2006.01) |
| *B60W 10/11* | (2012.01) |
| *F16D 21/02* | (2006.01) |
| *F16D 25/00* | (2006.01) |
| *F16D 33/18* | (2006.01) |
| *B60W 10/02* | (2006.01) |

(52) U.S. Cl.
CPC .............. *F16D 21/02* (2013.01); *F16D 25/00* (2013.01); *F16D 33/18* (2013.01); *B60W 10/02* (2013.01); *B60W 10/023* (2013.01); *B60W 10/06* (2013.01)

(58) Field of Classification Search
USPC ...................................... 701/67, 68; 477/115
See application file for complete search history.

(56) References Cited

U.S. PATENT DOCUMENTS

| 8,308,608 | B2 | 11/2012 | Wilke et al. | |
| 8,510,005 | B1 | 8/2013 | Monajemi et al. | |
| 2010/0063698 | A1* | 3/2010 | Lee et al. | 701/67 |
| 2010/0228412 | A1* | 9/2010 | Sah | 701/22 |
| 2011/0054755 | A1* | 3/2011 | Yamada | 701/68 |
| 2011/0295476 | A1* | 12/2011 | Ellis | 701/67 |

* cited by examiner

*Primary Examiner* — Edwin A Young
(74) *Attorney, Agent, or Firm* — Quinn Law Group, PLLC

(57) ABSTRACT

A vehicle includes a transmission having a plurality of clutches, including an oncoming binary clutch and an off-going clutch. The oncoming binary clutch is a binary device and the off-going clutch is a non-binary device. An internal combustion engine is operatively connected to the transmission and configured to generate an engine torque based on an input torque request. A controller is operatively connected to the transmission and has a processor and tangible, non-transitory memory on which is recorded instructions for executing a method for controlling a power-on downshift with the off-going clutch and the oncoming binary clutch. The controller is configured to generate a first pressure command at below a threshold pressure to at least partially pressurize the oncoming binary clutch and initiate a clutch slip for the off-going clutch. Among other steps, the controller is configured to determine if synchronization is met.

18 Claims, 4 Drawing Sheets

CONTROL OF POWER-ON DOWNSHIFT IN A VEHICLE WITH AN ONCOMING BINARY CLUTCH

TECHNICAL FIELD

The disclosure relates generally to control of a power-on downshift in a transmission assembly in a vehicle with an oncoming binary clutch.

BACKGROUND

Vehicle transmissions generally include one or more clutches for performing various functions. A clutch generally uses friction to rotatably couple two different elements, for example, rotatably coupling an input shaft to an output shaft. The clutches in the vehicle are engaged in accordance with vehicle speed and engine load conditions so that the transmission is upshifted to successively lower numerical gear ratios as the speed of the vehicle is increased, and downshifted to successively higher numerical gear ratios as the speed of the vehicle is decreased. The clutches generally employed in transmissions are fluid-actuated plate clutches having a series of spaced friction plates. Plate clutches are typically controlled with a variable rate of slip such that the state of the plate clutch can range from fully-applied (no slip at clutch) to fully-released (no limitation or control on clutch slip), as well as anywhere in between these two states.

SUMMARY

A vehicle includes a transmission having a plurality of clutches, including an oncoming binary clutch and an off-going clutch. The oncoming binary clutch is a binary device and the off-going clutch is a non-binary device. Unlike conventional friction plate clutches, a binary device has just two possible clutch states: fully-applied and fully-released. The oncoming binary clutch may be a dog clutch or a selectable one-way clutch (SOWC). The off-going clutch may be a wet or dry friction plate clutch. The oncoming binary clutch is characterized by a threshold pressure such that the oncoming binary clutch is engaged when a pressure at or above a threshold pressure is applied.

An internal combustion engine is operatively connected to the transmission and configured to generate an engine torque based on an input torque request. A torque converter is operatively connected to the transmission and includes a turbine defining a turbine speed. A controller is operatively connected to the transmission and has a processor and tangible, non-transitory memory on which is recorded instructions for executing a method for controlling a power-on downshift with the off-going clutch and the oncoming binary clutch. A downshift refers to a shift operation from a higher gear ratio to a lower gear ratio. A power-on downshift refers to a downshift operation when additional power or input torque is being requested (e.g., via the throttle).

Execution of the instructions by the processor causes the controller to (i.e., the controller is configured to) generate a first pressure command at below the threshold pressure to at least partially pressurize the oncoming binary clutch. The controller is configured to initiate a clutch slip for the off-going clutch and determine if synchronization of the oncoming clutch is met. Synchronization is met when a slip speed across the oncoming binary clutch is zero.

A fluid pump is operatively connected to and configured to provide transmission fluid to the transmission. The fluid pump defines a line pressure based on the pressure of the transmission fluid. The controller is configured to vary an off-going pressure command to the off-going clutch in order to at least partially control the turbine speed. When synchronization is met, a second pressure command is generated for the oncoming binary clutch at the threshold pressure.

The controller is configured to determine if the oncoming binary clutch is physically engaged. When the oncoming binary clutch is physically engaged, a third pressure command is generated for the oncoming binary clutch at the line pressure and the off-going pressure to the off-going clutch is reduced to zero. A position sensor may be operatively connected to the oncoming binary clutch and configured to determine if the oncoming binary clutch is physically engaged, i.e., if a first and second element of the oncoming binary clutch are in contact.

A speed sensor may be operatively connected to the turbine and configured to measure the turbine speed. The controller may be configured to store data for an estimated turbine speed at a commanded gear ratio. Determining if synchronization is met may include comparing the turbine speed measured by the speed sensor to the estimated turbine speed at the commanded gear ratio, at which point the slip speed across the oncoming binary clutch is zero.

In a first embodiment, the input torque request is regulated or commanded by the controller. In a second embodiment, the input torque request is regulated or commanded by a pedal position of an accelerator pedal operatively connected to the transmission. A method is provided for controlling the power-on downshift with the off-going clutch and the oncoming binary clutch.

The above features and advantages and other features and advantages of the present invention are readily apparent from the following detailed description of the best modes for carrying out the invention when taken in connection with the accompanying drawings.

DETAILED DESCRIPTION

Figure 1:
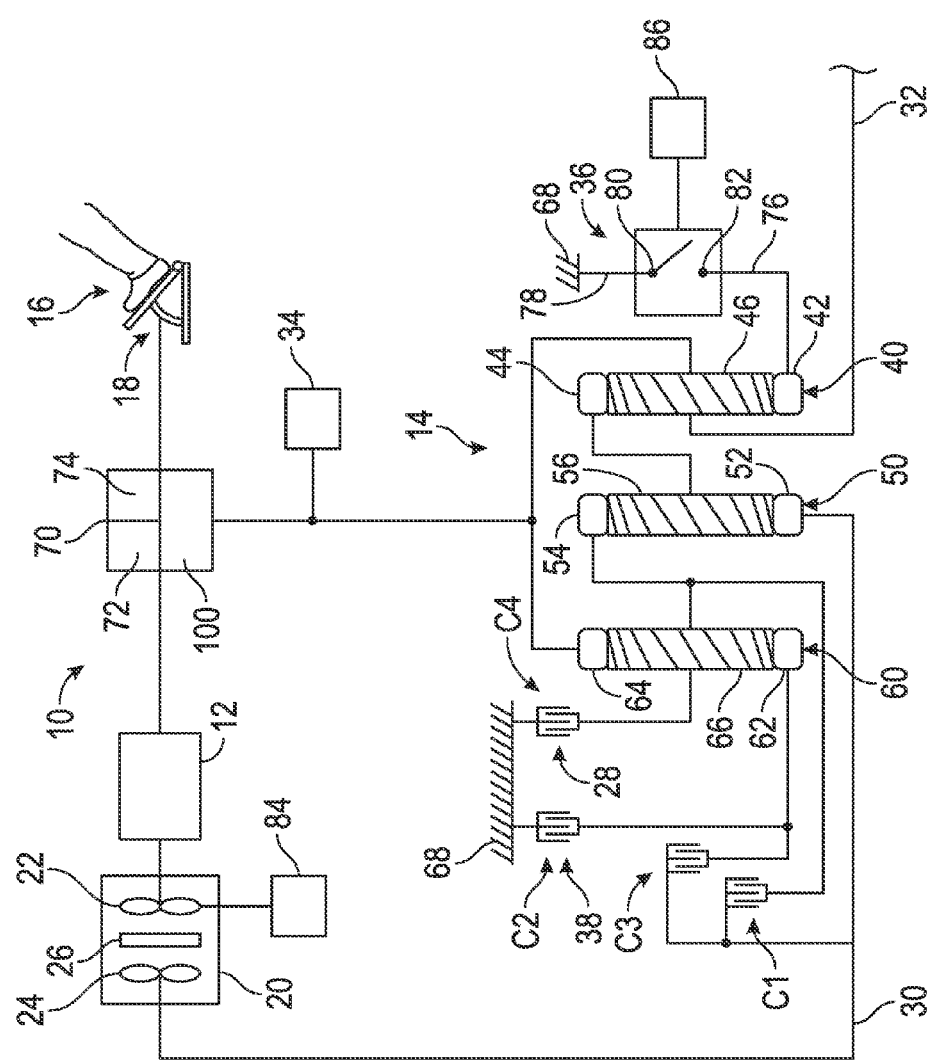
FIG. 1 is a schematic illustration of a vehicle having an engine, a controller and a transmission having a plurality of clutches.

Referring to the drawings, wherein like reference numbers refer to like components, FIG. 1 is a schematic illustration of a vehicle 10 having an engine 12 and a transmission 14. A controller 70 is operatively connected to the engine 12 and the transmission 14. As described below with reference to FIG. 2, the controller 70 has a processor 72 and tangible, non-transitory memory 74 on which are recorded instructions for executing a method 100 for controlling a power-on downshift with an off-going clutch 38 and an oncoming binary clutch 36 in the vehicle 10. A downshift refers to a shift operation from a higher gear ratio to a lower gear ratio. A power-on downshift refers to a downshift operation when additional power or input torque is being requested.

The controller 70 may be an integral portion of or a separate module operatively connected to the transmission control module (TCM) and/or the engine control module (ECM) of the vehicle 10. The vehicle 10 may be any passenger or commercial automobile such as a hybrid electric vehicle, including a plug-in hybrid electric vehicle, an extended range electric vehicle, or other vehicles. The vehicle may take many different forms and include multiple and/or alternate components and facilities. While an example vehicle is shown in the Figures, the components illustrated in the Figures are not intended to be limiting. Indeed, additional or alternative components and/or implementations may be used.

The engine 12 is responsive to an input torque request ($T_R$) requesting a relative level of engine torque. In a first embodiment (described below with reference to FIG. 3), the input torque request ($T_R$) is regulated or commanded by the controller 70, without any input from an accelerator pedal 16 (see FIG. 1). In a second embodiment (described below with reference to FIG. 4), the input torque request ($T_R$) is regulated or commanded by the accelerator pedal 16, in the form of an apply force to the accelerator pedal 16 or a corresponding percentage of travel as indicated by a pedal position 18. The input torque request ($T_R$) may be communicated from the accelerator pedal 16 to the controller 70 through a user interface (not shown). The pedal position 18 may be detected via a force or position sensor (not shown) in a conventional manner known to those skilled in the art. In response to the input torque request ($T_R$) the engine 12 generates engine torque, which is delivered as an input torque to the transmission 14. The engine 12 may include any device configured to generate the engine torque by, for example, converting a fuel into rotational motion. Accordingly, the engine 12 may be an internal combustion engine configured to convert energy from a fossil fuel into rotational motion using a thermodynamic cycle.

Referring to FIG. 1, a torque converter 20 is operatively connected to the engine 12 and transmission 14. As is known to those skilled in the art, the torque converter 20 includes a pump 22, a turbine 24 and a stator 26 that may be positioned between the pump 22 and turbine 24. The turbine 24 spins due to the motion of transmission fluid and defines a turbine speed. The torque converter 20 may include other components not shown.

Referring to FIG. 1, the transmission 14 includes a plurality of clutches 28 that are selectively engageable in different combinations to establish multiple forward gear ratios and a reverse gear ratio between an input member 30 and an output member 32 of the transmission 14. It is to be understood that the transmission 14 shown in FIG. 1 is provided as a non-limiting example and any suitable transmission known to those skilled in the art may be employed in the vehicle 10. The input member 30 receives input torque from the engine 12, and the output member 32 provides the torque through a final drive to vehicle wheels (not shown), as is understood by those skilled in the art. The turbine 24 is connected to the input member 30, and that causes the input member 30 to rotate at the turbine speed.

A fluid pump 34 is operatively connected to the transmission 14 and configured to provide transmission fluid to the plurality of clutches 28, the turbine 24 and various other components. The fluid pump 34 defines a line pressure based on the pressure of the transmission fluid.

The transmission 14 defines a plurality of gear ratios or speed ratios. Shifting between gear ratios involves, in most cases, disengaging a clutch (known as an off-going clutch) associated with the initial gear ratio and engaging another clutch (known as an oncoming clutch) associated with the other gear ratio. Referring to FIG. 1, the transmission 14 includes an oncoming binary clutch 36 and an off-going clutch 38. The oncoming binary clutch 36 is a binary device and the off-going clutch 38 is a non-binary device. The oncoming binary clutch 36 has only two possible clutch states: fully-applied and fully-released. The off-going clutch 38 is controlled with a variable rate of slip such that its state can range from fully-applied to fully-released, as well as anywhere in between these two states. The off-going clutch 38 may be any one of the clutches 30 in the transmission, such as clutches C1, C2, C3 and C4 shown in FIG. 1.

Referring to FIG. 1, the transmission 14 includes a gearing arrangement of three planetary gear sets 40, 50 and 60. Each planetary gear set 40, 50 and 60 has a respective sun gear member 42, 52, 62, ring gear member 44, 54, 64 and carrier member 46, 56, 66 that supports pinion gears that mesh with both the respective sun gear members 42, 52, 62 and the respective ring gear members 44, 54, 64. The clutch C1 is engageable to connect the input member 30 to the ring gear member 54 and the carrier member 66. The clutch C2 is engageable to connect the sun gear member 62 to the stationary member 68. The clutch C3 is engageable to connect the input member 30 to the sun gear member 62. The clutch C4 is engageable to connect the carrier member 66 to the stationary member 68. The input member 30 is continuously interconnected with the sun gear member 52. The ring gear member 54 and the carrier member 66 are continuously connected. The ring gear member 64 and the carrier member 46 are continuously connected. The ring gear member 44 and the carrier member 56 are continuously connected. The clutches C1-C4 are operatively connected to the controller 70. As previously noted, any suitable transmission known to those skilled in the art may be employed in the vehicle 10.

Referring to FIG. 1, the oncoming binary clutch 36 is used to connect and disconnect shafts 76, 78 in the transmission 14. The oncoming binary clutch 36 may be a dog clutch. In another example, the oncoming binary clutch 36 may be a selectable one-way clutch (SOWC). Referring to FIG. 1, the binary clutch 36 includes a first and a second element 80, 82. Prior to engagement of the binary clutch 36, the first and second elements 80, 82 must be synchronized. The binary clutch 36 may function by mating a set of regularly spaced teeth (not shown) on one of the first and second elements 80, 82 to a set of identical recesses (not shown) on the other of the first and second elements 82, 80. This allows both shafts 76, 78 to rotate at the same speed without slipping and with minimal clutch wear.

In the embodiment shown, the second element 82 is operatively connected to the sun gear member 42 of the first planetary gear set 40 and the first element 80 is operatively connected to the stationary member 68. The oncoming binary clutch 36 is characterized by a threshold pressure such that the oncoming binary clutch 36 is engaged when the threshold pressure is applied. For example, when the binary clutch 36 is disengaged, the first and second elements 80, 82 may be kept separate with the use of a biasing member (not shown) operatively connected to the first and second elements 80, 82. When the fluid pressure (from the transmission fluid) on the binary clutch 36 reaches or exceeds the threshold pressure, it becomes fully engaged.

The off-going clutch 38 may be a wet or dry friction plate clutch. The off-going clutch 38 may be hydraulically operated, i.e., it may be configured to engage when provided with fluid at a minimum pressure and disengage when provided with fluid below the minimum pressure. The off-going clutch 38 may include any device configured to engage to transfer torque generated by one component of the vehicle 10 to another. For instance, the off-going clutch 38 may include a driving mechanism and a driven mechanism. The driving mechanism may be configured to rotate when provided with a rotational force. When fully engaged, the driven mechanism may rotate at the same speed as the driving mechanism. When disengaged or partially engaged, however, the driven mechanism is free to slip relative to the driving mechanism, allowing the driving mechanism and the driven mechanism to rotate at different speeds.

Figure 2:
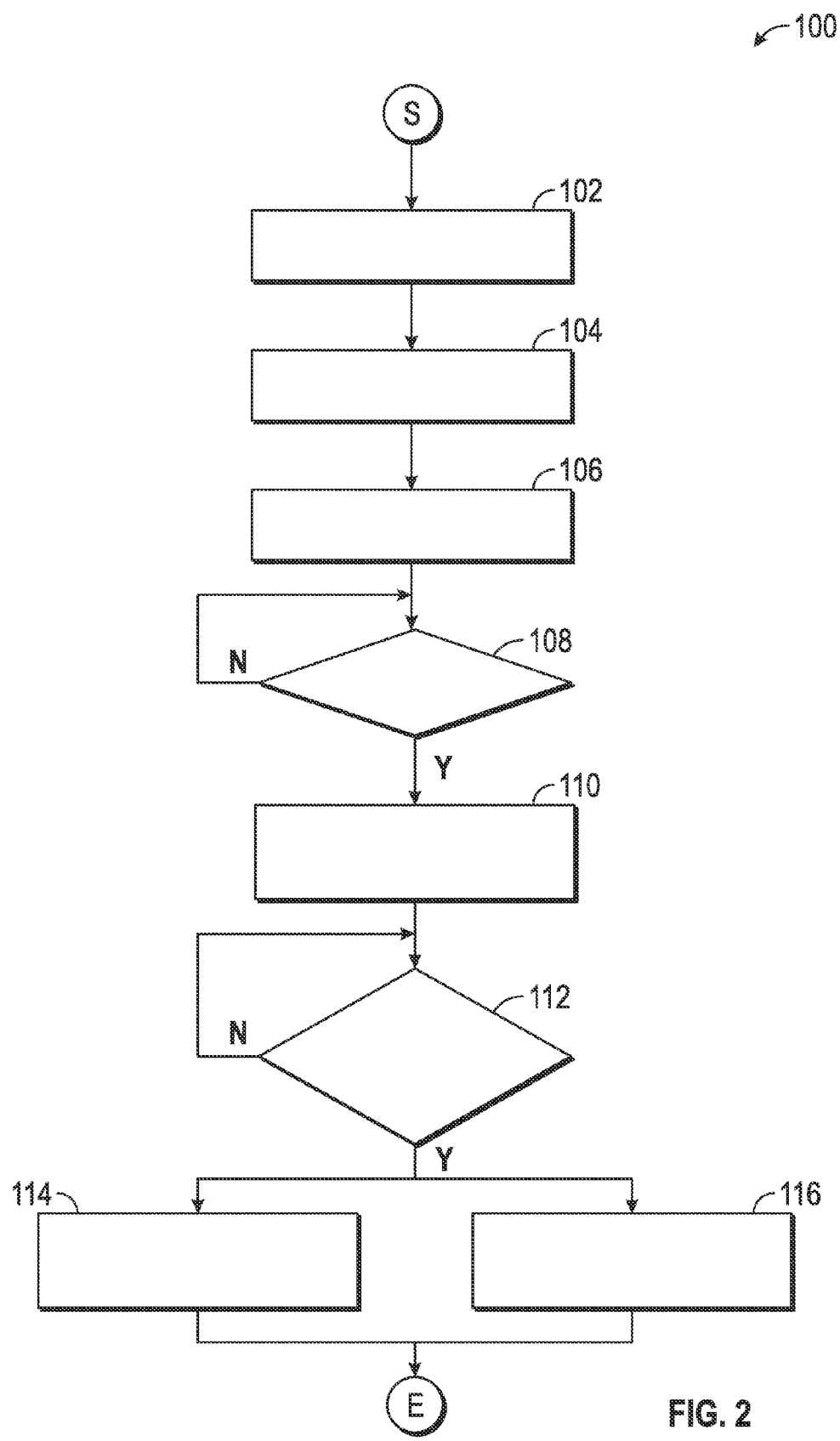
FIG. 2 is a flowchart of a method stored on and executable by the controller of FIG. 1.
Figure 3:
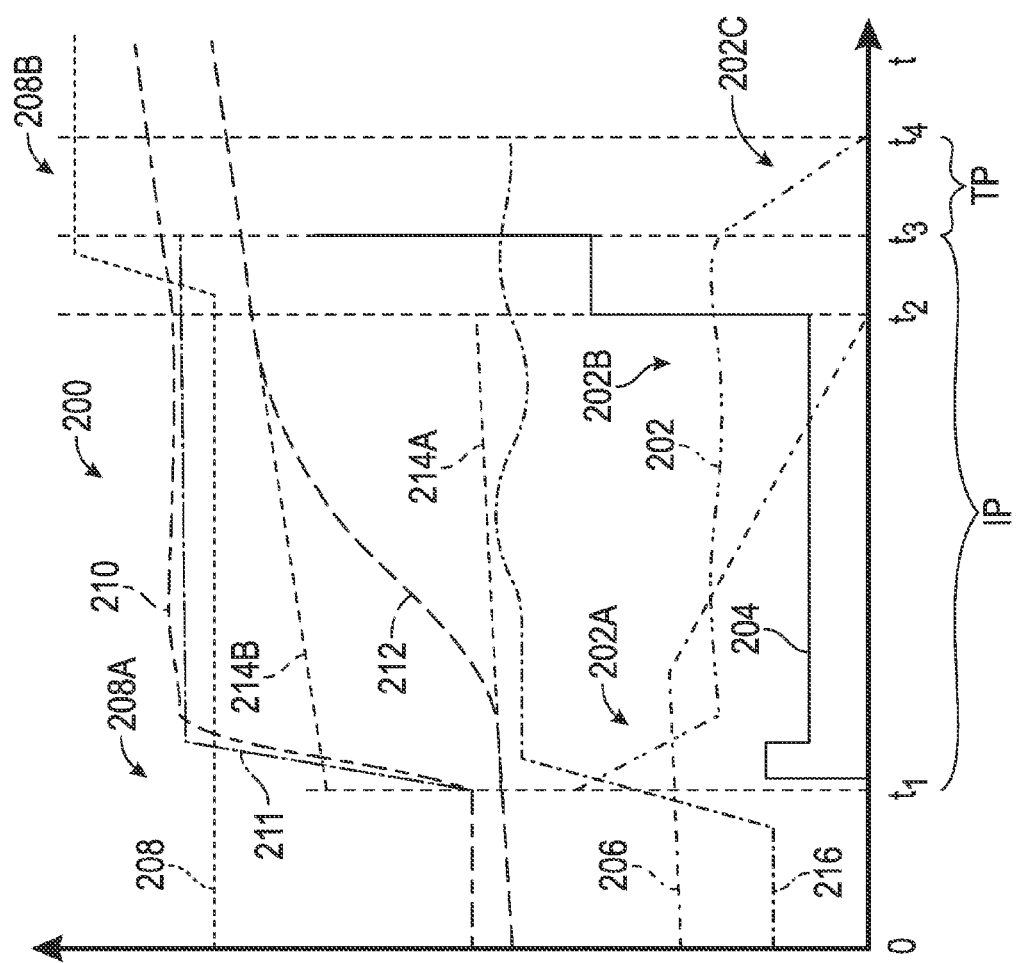
FIG. 3 is a plot of transmission control values for the vehicle of FIG. 1, where the vertical axis represents the amplitude of the values and the horizontal axis represents time, in accordance with a first embodiment.
Figure 4:
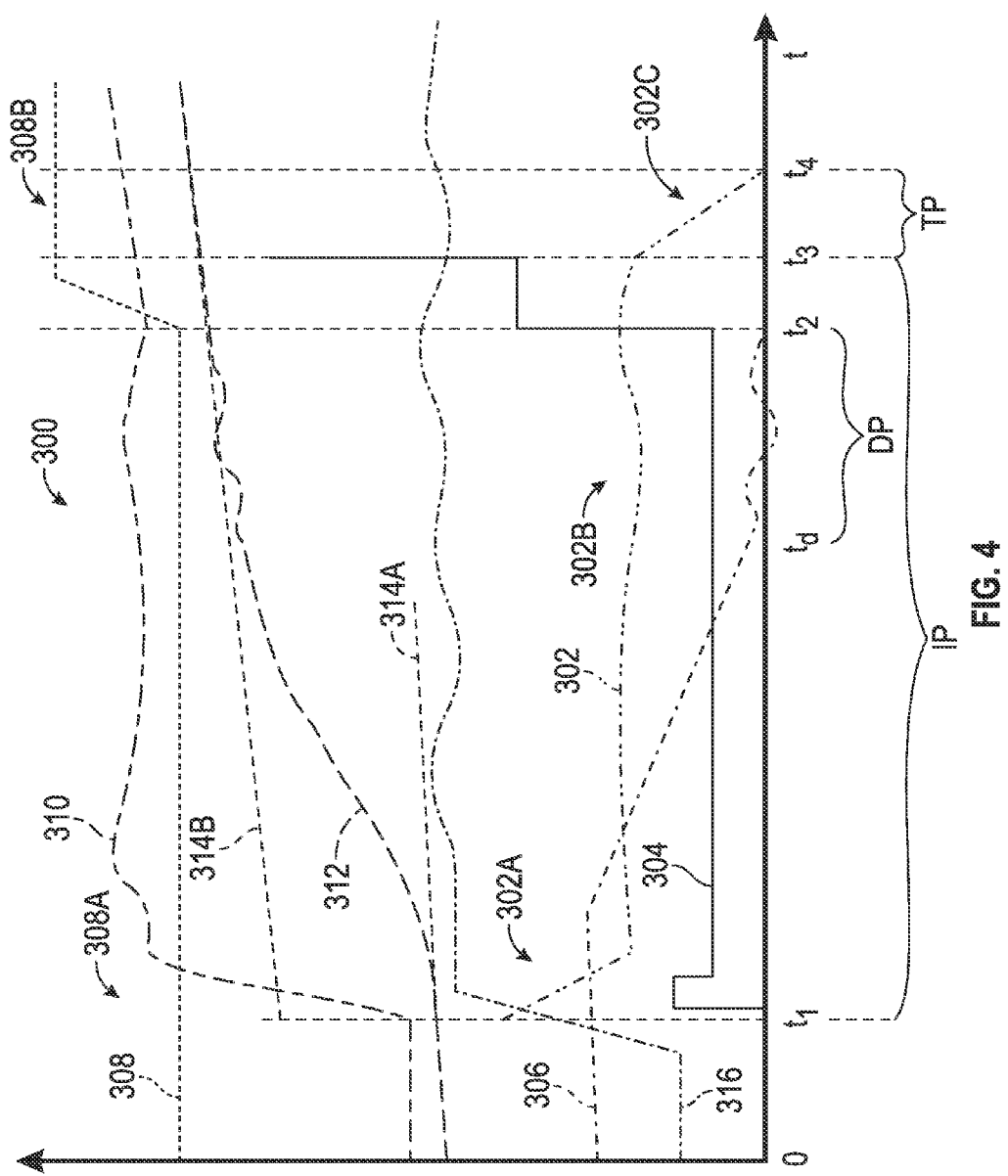
FIG. 4 is another plot of transmission control values for the vehicle of FIG. 1, where the vertical axis represents the amplitude of the values and the horizontal axis represents time, in accordance with a second embodiment.

Referring now to FIG. 2, a flowchart of a method 100 stored on and executable by the controller 70 of FIG. 1 is shown. The start and end of the method 100 are indicated by the letters "S" and "E" in FIG. 2, respectively. Method 100 need not be applied in the specific order recited herein. Furthermore, it is to be understood that some steps may be eliminated. Method 100 is described below with reference to FIGS. 2-4. FIGS. 3-4 are plots of transmission control values for the vehicle 10, in accordance with a first and a second embodiment. FIGS. 3-4 are intended as non-limiting examples. In FIGS. 3-4, the vertical axis represents the amplitude of the values and the horizontal axis represents time, indicated by the letter "t." The inertial phase (or speed phase) of the downshift is indicated on the horizontal axis with the letters "IP" while the torque phase is indicated on the horizontal axis with the letters "TP."

For the traces described below, reference numerals in the 200 and 300 series refer to FIGS. 3 and 4, respectively. Traces 202, 302 represent the pressure of the off-going clutch 38, referred to herein as the "off-going pressure." Traces 204, 304 represent the pressure commands for the oncoming binary clutch 36. Traces 206, 306 represent the slip or speed difference across the oncoming binary clutch 36. Traces 208, 308 represent the position of the oncoming binary clutch 36, with portions 208A/308A indicating where the oncoming binary clutch 36 is not engaged and portions 208B/308B indicating where oncoming binary clutch 36 is physically engaged. Traces 210, 310 represent the engine torque. Trace 211 represents the desired engine torque. Traces 212, 312 represent the turbine speed. Traces 216, 316 represent the pedal position 18 of the accelerator pedal 16 (see FIG. 1). Each of the traces or graphs shown in FIGS. 3 and 4 may be adjusted or calibrated with adjustment offset values. The adjustment offset values may be stored in one or more look-up tables, databases, data repositories, or other types of data stores.

Referring to FIG. 2, method 100 may begin with step 102 where the controller 70 generates a first pressure command at below the threshold pressure ($P_R$) to at least partially pressurize the oncoming binary clutch 36. An example of a first pressure command is shown in FIGS. 3-4 in traces 204 and 304, respectively, between times $t_1$ and $t_2$. The magnitude of the first pressure command depends on the temperature of the transmission fluid, the turbine speed, the particular characteristics of the oncoming binary clutch 36 and other factors. By way of a non-limiting example, the threshold pressure may be 100 kPa and the first pressure command may be set at between approximately 30 kPa to 80 kPa. In another example, the threshold pressure may be 200 kPa and the first pressure command may be set at between approximately 50 kPa to 170 kPa.

In step 104 of FIG. 2, the controller 70 is configured to initiate a clutch slip for the off-going clutch 38. Referring to FIGS. 3-4, an example of a clutch slip is shown in portions 202A, 302A of the traces 202, 302, respectively, which indicate the off-going pressure to the off-going clutch 38.

In step 106 of FIG. 2, the controller 70 is configured to vary the off-going pressure command to the off-going clutch 38 in order to at least partially control the turbine speed during the inertia phase to follow a defined profile. In executing the power-on downshift, the turbine speed ramps up from respective first speed traces 214A, 314A associated with a higher gear to the respective second speed traces 214B, 314B associated with a lower gear. The rate of change of input speed increase or input acceleration for turbine speed during the first part of the downshift in the inertia phase depends on both the input torque request ($T_R$) and the torque of the off-going clutch 38. The torque of the off-going clutch 38 (and the input torque request ($T_R$) in case of the second embodiment) is used to control the turbine speed such that the oncoming binary clutch 36 can be synchronized before engagement. This is done while output torque is also supplied to maintain vehicle acceleration, and is not done when the transmission 14 is in neutral. An example of the off-going pressure command is shown in portions 202B, 302B of the traces 202, 302, respectively, in FIGS. 3-4.

In step 108 of FIG. 2, the controller 70 is configured to determine if synchronization is met. Synchronization or the sync state is met when a slip speed across the oncoming binary clutch 36 is zero. An example slip speed across the oncoming binary clutch 36 is indicated by traces 206, 306 in FIGS. 3-4, respectively. The slip speed across the oncoming binary clutch 36 may be defined as a difference in rotational speed between the first and second elements 80 and 82. The slip speed across the oncoming binary clutch 36 is zero when the measured turbine speed is equal to the estimated turbine speed at the commanded gear ratio. Thus, determining if synchronization is met may include comparing the measured turbine speed to an estimated turbine speed at the commanded gear ratio.

Referring to FIG. 1, speed sensor 84 may be operatively connected to the turbine 24. The speed sensor 84 is configured to measure the turbine speed and provide it to the controller 70. The controller 70 may be configured to store data for estimated turbine speeds at respective commanded gear ratios, e.g. in look-up tables, databases, data repositories, or other types of data stores. The controller 70 may be configured to determine if synchronization is met by comparing the turbine speed (measured by the speed sensor 84) to the estimated turbine speed at the commanded gear ratio (from the stored data).

In step 110 of FIG. 2, the controller 70 is configured to, when synchronization is met, generate a second pressure command for the oncoming binary clutch 36 at the threshold pressure. An example of a second pressure command is shown in FIGS. 3-4 in traces 204 and 304, respectively, between times $t_2$ and $t_3$.

In step 112 of FIG. 2, the controller 70 is configured to determine if the oncoming binary clutch 36 is physically engaged. Referring to FIG. 1, a position sensor 86 may be configured to determine if the oncoming binary clutch 36 is physically engaged, i.e. if the first and second elements 80, 82 are in contact. The position sensor 86 is operatively connected to and configured to convey this information to the controller 70. Traces 208, 308 represent the position of the oncoming binary clutch 36 in FIGS. 3-4, respectively, with portions 208A/308A indicating where the oncoming binary clutch 36 is not engaged and portions 208B/308B indicating where the oncoming binary clutch 36 is physically engaged.

In step 114, the controller 70 is configured to generate a third pressure command for the oncoming binary clutch 36 at the line pressure. An example of a third pressure command is shown in FIGS. 3-4 in traces 204 and 304, respectively, at time $t_3$.

In step 116 of FIG. 2, the controller 70 is configured to reduce the off-going pressure to the off-going clutch 38 to zero. Referring to FIGS. 3-4, an example is shown in portions 202C, 302C (between times $t_3$ and $t_4$) of the traces 202, 302, respectively, which indicate the off-going pressure to the off-going clutch 38.

The second embodiment is similar to the first embodiment, with a few differences as outlined below. In the first embodiment shown in FIG. 3, the input torque request ($T_R$) is regulated or controlled by the controller 70 during the inertia phase, without any input from the accelerator pedal 16. The shift event is still initiated by input from the accelerator pedal 16, but the specific value of the torque command or input torque request ($T_R$) is not a direct function of pedal position 18 during the inertia phase. In the first embodiment, the controller 70 takes control over the input torque request ($T_R$) during the inertia phase to allow precise command of the torque of the off-going clutch 38 to achieve synchronization of the oncoming binary clutch 36 at the end of the downshift.

In the second embodiment, the input torque request ($T_R$) is regulated or controlled by the accelerator pedal 16, in the form of an apply force to the accelerator pedal 16 or a corresponding percentage of travel as indicated by the pedal position 18 (see FIG. 1). In the second embodiment, the controller 70 does not regulate the input torque request ($T_R$), but modulates the torque of the off-going clutch 38 to handle whatever level of input torque is requested based on the pedal position 18. In FIGS. 3-4, traces 216, 316 represent the pedal position 18 of the accelerator pedal 16 (see FIG. 1).

Additionally, the second embodiment shown in FIG. 4 includes a delay period, indicated by the letters "DP," within the inertia phase. In this embodiment, since the input torque request ($T_R$) is regulated or controlled by the accelerator pedal 16, the off-going clutch 38 must adjust to achieve synchronization as the pedal position 18 changes (see trace 316 in FIG. 4). The first embodiment shown in FIG. 3 does not include the possibility of this additional delay period in the illustration. The examples shown in FIGS. 3-4 are intended to be non-limiting; additional states and levels of pressure commands may be used, and the ones used in the illustration may be omitted.

As noted above, the controller 70 of FIG. 1 may include a computing device that employs an operating system or processor 72 and memory 74 for storing and executing computer-executable instructions. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor 72 (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a transmission having a plurality of clutches including an oncoming binary clutch and an off-going clutch, the oncoming binary clutch being a binary device and the off-going clutch being a non-binary device;
   wherein the oncoming binary clutch is engaged when a pressure at or above a threshold pressure is applied;
   an internal combustion engine operatively connected to the transmission and configured to generate an engine torque based on an input torque request ($T_R$);
   a torque converter operatively connected to the transmission and including a turbine defining a turbine speed; and
   a controller operatively connected to the transmission and having a processor and tangible, non-transitory memory on which is recorded instructions for executing a method for controlling a power-on downshift with the off-going clutch and the oncoming binary clutch;
   wherein execution of the instructions by the processor causes the controller to:
      generate a first pressure command at a level below the threshold pressure to at least partially pressurize the oncoming binary clutch;
      initiate a clutch slip for the off-going clutch; and
      determine if synchronization is met, wherein synchronization is met when a slip speed across the oncoming binary clutch is zero.

2. The vehicle of claim 1, wherein the oncoming binary clutch is a dog clutch or a selectable one-way clutch (SOWC).

3. The vehicle of claim 1, wherein the input torque request is regulated by the controller during an inertia phase of the downshift.

4. The vehicle of claim 1, further comprising:
an accelerator pedal operatively connected to the controller and defining a pedal position; and
wherein the input torque request is regulated by the pedal position of the accelerator pedal during an inertia phase of the downshift.

5. The vehicle of claim 1, further comprising:
a speed sensor operatively connected to the turbine and configured to measure the turbine speed;
wherein the controller is configured to store data for an estimated turbine speed at a commanded gear ratio; and
wherein said determining if synchronization is met includes comparing the turbine speed measured by the speed sensor to the estimated turbine speed at the commanded gear ratio.

6. The vehicle of claim 1, wherein the controller is configured to vary an off-going pressure command to the off-going clutch in order to at least partially control the turbine speed during an inertia phase of the downshift.

7. The vehicle of claim 1, further comprising:
a fluid pump operatively connected to and configured to provide transmission fluid to the transmission, the fluid pump defining a line pressure based on a pressure of the transmission fluid;
wherein the controller is further configured to:
when synchronization is met, generate a second pressure command for the oncoming binary clutch at the threshold pressure;
determine if the oncoming binary clutch is physically engaged; and
when the oncoming binary clutch is physically engaged, generate a third pressure command for the oncoming binary clutch at the line pressure and reduce the off-going pressure to the off-going clutch to zero.

8. The vehicle of claim 7, further comprising:
a position sensor operatively connected to the oncoming binary clutch and configured to determine if the oncoming binary clutch is physically engaged.

9. A transmission assembly for use in a vehicle having a turbine defining a turbine speed, the assembly comprising:
a plurality of clutches including an oncoming binary clutch and an off-going clutch, the oncoming binary clutch being a binary device and the off-going clutch being a non-binary device;
wherein the oncoming binary clutch is engaged when a pressure at or above a threshold pressure is applied;
a controller operatively connected to the plurality of clutches and having a processor and tangible, non-transitory memory on which is recorded instructions for executing a method for controlling a power-on downshift with the off-going clutch and the oncoming binary clutch;
wherein execution of the instructions by the processor causes the controller to:
generate a first pressure command at a level below the threshold pressure to at least partially pressurize the oncoming binary clutch;
initiate a clutch slip for the off-going clutch; and
determine if synchronization is met, wherein synchronization is met when a slip speed across the oncoming binary clutch is zero.

10. The assembly of claim 9, wherein the oncoming binary clutch is a dog clutch.

11. The assembly of claim 9, wherein an input torque request ($T_R$) is regulated by the controller during an inertia phase of the downshift.

12. The assembly of claim 9:
wherein the controller is connectable to an accelerator pedal defining a pedal position; and
wherein an input torque request ($T_R$) is regulated by the pedal position of the accelerator pedal during an inertia phase of the downshift.

13. The assembly of claim 9, wherein the controller is configured to vary an off-going pressure command to the off-going clutch in order to at least partially control the turbine speed during an inertia phase of the downshift.

14. The assembly of claim 9, further comprising:
a fluid pump operatively connected to and configured to provide transmission fluid to the plurality of clutches, the fluid pump defining a line pressure based on a pressure of the transmission fluid;
wherein the controller is further configured to:
when synchronization is met, generate a second pressure command for the oncoming binary clutch at the threshold pressure;
determine if the oncoming binary clutch is physically engaged; and
when the oncoming binary clutch is physically engaged, generate a third pressure command for the oncoming binary clutch at the line pressure and reduce the off-going pressure to the off-going clutch to zero.

15. The assembly of claim 9, further comprising:
a position sensor operatively connected to the oncoming binary clutch and configured to determine if the oncoming binary clutch is physically engaged.

16. A method of controlling a power-on downshift with an off-going clutch and an oncoming binary clutch in a vehicle having a turbine defining a turbine speed and a transmission, the method comprising:
generating a first pressure command at a level below a threshold pressure to at least partially pressurize the oncoming binary clutch;
wherein the oncoming binary clutch is a binary device and the off-going clutch is a non-binary device;
initiating a clutch slip for the off-going clutch; and
determining if synchronization is met, wherein synchronization is met when a slip speed across the oncoming binary clutch is zero.

17. The method of claim 16, further comprising:
varying an off-going pressure command to the off-going clutch in order to at least partially control the turbine speed during an inertia phase of the downshift.

18. The method of claim 16, further comprising:
when synchronization is met, generating a second pressure command for the oncoming binary clutch at the threshold pressure, thereby applying an engage pressure to the oncoming binary clutch;
determining if the oncoming binary clutch is physically engaged;
if the oncoming binary clutch is physically engaged, applying a line pressure to the oncoming binary clutch and reducing the off-going pressure to the off-going clutch to zero.

* * * * *